US009101023B2

(12) United States Patent
Ota

(10) Patent No.: US 9,101,023 B2
(45) Date of Patent: Aug. 4, 2015

(54) LIGHT-EMITTING ELEMENT DRIVING CIRCUIT AND DISPLAY DEVICE

(71) Applicant: NLT Technologies, Ltd., Kanagawa (JP)

(72) Inventor: Shinji Ota, Kanagawa (JP)

(73) Assignee: NLT TECHNOLOGIES, LTD., Kanagawa (JP)

( * ) Notice: Subject to any disclaimer, the term of this patent is extended or adjusted under 35 U.S.C. 154(b) by 0 days.

(21) Appl. No.: 14/071,921

(22) Filed: Nov. 5, 2013

(65) Prior Publication Data
US 2014/0125243 A1    May 8, 2014

(30) Foreign Application Priority Data

Nov. 7, 2012  (JP) .................................. 2012-244963

(51) Int. Cl.
| | | |
|---|---|---|
| H05B 37/02 | (2006.01) | |
| H05B 39/04 | (2006.01) | |
| H05B 41/36 | (2006.01) | |
| H05B 41/282 | (2006.01) | |
| H05B 33/08 | (2006.01) | |

(52) U.S. Cl.
CPC ........ *H05B 33/0842* (2013.01); *H05B 33/0818* (2013.01); *H05B 41/282* (2013.01); *Y02B 20/346* (2013.01)

(58) Field of Classification Search
CPC ............... H05B 37/029; H05B 39/045; H05B 41/2825; H05B 33/0803; H05B 37/0254
USPC .......................................... 315/210, 209, 312
See application file for complete search history.

(56) References Cited

U.S. PATENT DOCUMENTS

| | | | | |
|---|---|---|---|---|
| 8,569,975 | B2 * | 10/2013 | Uchimoto et al. ............. | 315/307 |
| 2006/0055661 | A1 * | 3/2006 | Kawaguchi ..................... | 345/102 |
| 2009/0051629 | A1 * | 2/2009 | Price et al. ...................... | 345/82 |
| 2013/0175934 | A1 * | 7/2013 | Fujita ............................. | 315/186 |

FOREIGN PATENT DOCUMENTS

| | | |
|---|---|---|
| JP | 2011-138666 | 7/2011 |
| JP | 2011-242570 | 12/2011 |
| JP | 2012-015369 | 1/2012 |

* cited by examiner

*Primary Examiner* — Dylan White
(74) *Attorney, Agent, or Firm* — Young & Thompson

(57) ABSTRACT

A light-emitting element driving circuit controls the luminance of light-emitting elements by using a PWM signal. A display device includes the driving circuit and multiple light-emitting elements. The driving circuit includes a control circuit that generates a control signal by using a divided signal based on an input PWM signal, and a light-emitting element driving unit that drive the light-emitting elements by using the control signal. The control signal includes a larger number of frequency components in comparison with frequency components of the input PWM signal.

9 Claims, 19 Drawing Sheets

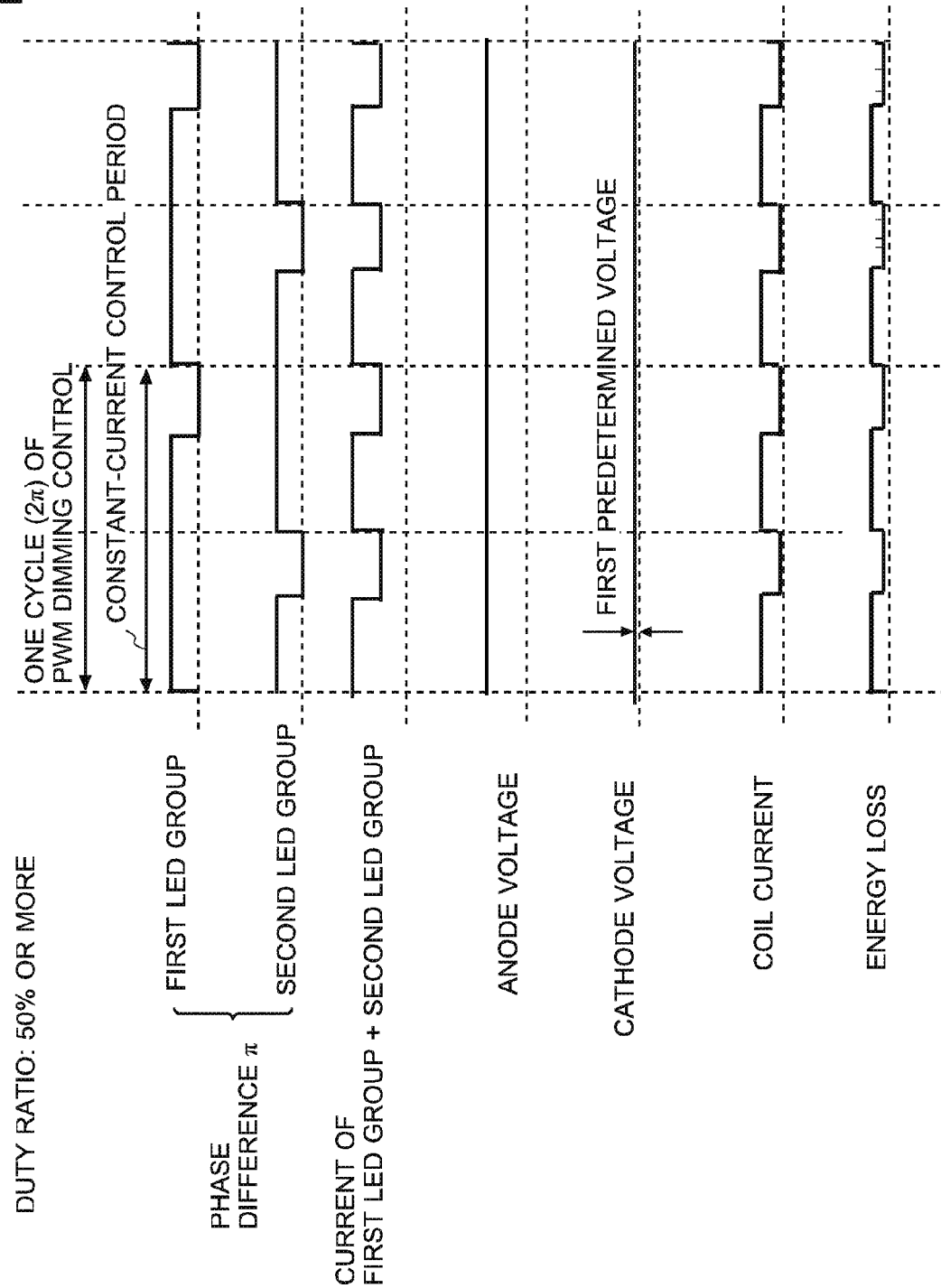

LIGHT-EMITTING ELEMENT DRIVING CIRCUIT AND DISPLAY DEVICE

TECHNICAL FIELD

The present invention relates to a light-emitting element driving circuit and a display device, and especially to a light-emitting element driving circuit configured to drive LEDs (Light emitting diodes) and a display device equipped with the light-emitting element driving circuit.

BACKGROUND

Taking in consideration of environmental factors, a replacement of a CCFL (Cold Cathode Fluorescent Lamp) with LEDs in a backlight unit for use in a liquid crystal display device is now proceeding. CCFL-type backlight units have employed, for dimming itself, a way to apply a signal of sinusoidal wave to a CCFL. In contrast, LED-type back light units mainly employ, for dimming itself, a PWM (Pulse Width Modulation) method wherein a signal of rectangular wave is applied to LEDs.

FIG. 1 illustrates a structural example of a general light-emitting element driving circuit which includes a light-emitting element drive unit and light-emitting elements. This light-emitting element driving circuit employs LEDs as the light-emitting elements. Power supply voltage is externally applied to the light-emitting element driving circuit. In the light-emitting element drive unit, the voltage is increased by coil 2 and FET (Field Effect Transistor) 3. This structural example employs, as a switching signal to be applied to a gate of FET 3, the signal outputted by LED driver IC (Integrated Circuit) 7. The increased anode voltage is applied to an anode-side part of LED arrays 6 through schottky-barrier diode 4 for rectification. When the voltage is applied to LED arrays 6, the light-emitting element driving circuit choose whether to apply an electric current to LEDs or not in accordance with switching transistor 7a, and determines whether to turn the LEDs on or off. To control an ON/OFF state of the LEDs, a PWM signal for dimming is externally inputted to the circuit. To increase or decrease the luminance of a backlight unit, the ON and OFF periods of the LEDs are controlled to obtain a desired brightness. In this structure, capacitor 1 is a smoothing capacitor at the input-terminal side and capacitor 5 is a smoothing capacitor at the output-terminal side.

As an example of such an LED drive circuit, Japanese Unexamined Patent Application Publication (JP-A) No. 2012-15369 discloses an LED control device for driving plural LEDs, having the following structure. The LED control device is configured to turn each of LED groups on or off separately, where the LED groups are connected to a plurality of constant-current output circuits. The LED control device includes on LED drive section, a power-supply control section and a phase-difference control section. The LED drive section is configured to control whether to supply a current to each of the LED groups by the corresponding constant-current output circuit separately, in accordance with a PWM signal inputted corresponding to each of the LED groups. When at least one of the LED groups is turned on, the power-supply control section controls a power supplied from a power-supply device to which the LED groups are connected in parallel, by a first voltage control mode in which a voltage at a cathode-side end of the at least one of the LED groups to be turned on is kept at a first predetermined voltage value. When all the LED groups are turned off, the power-supply control section controls the power by a second voltage control mode in which a voltage at an anode-side end of the LED groups is kept at a second predetermined voltage value. The phase-difference control section gives a phase difference of $2\pi/n$ (where n is the number of LED groups) to each of the PWM signals which correspond respectively to the LED groups and are inputted to the LED drive section. FIG. 17A to 17C illustrate an example of operations of the LED device circuit.

As another example, JP-A No. 2011-13866 discloses an LED backlight drive circuit having the following structure. The LED backlight drive circuit includes a switched-mode DC/DC convertor, a LED driver IC and a load circuit. The switched-mode DC/DC convertor includes a smoothing capacitor around the output terminal thereof and is configured to supply a drive current to an LED backlight wherein one or more light-source arrays each including plural LEDs connected in series, are connected in parallel. The LED driver IC is configured to turn on or off the drive current which comes from the DC/DC converter and passes through the LED backlight in accordance with a PWM control signal. The load circuit is connected to the output terminal of the DC/DC converter, wherein during a period the drive circuit of the LED backlight is turned off, a current which is equivalent to the drive current enters from the DC/DC converter to the load circuit. The load circuit includes a load resistance connected to the output terminal of the DC/DC converter in parallel with the input terminal of the LED backlight, a switching element configured to turn on/off the flow of a current to the load resistance, and a switching control circuit configured to perform on-off control of the switching element to be synchronized with a PWM control signal. FIG. 18 illustrates an example of operations of the LED backlight drive circuit.

As another example, JP-A No. 2011-242570 discloses an LED video display device including plural LED display units arrayed to form an LED screen, wherein each of LED display units a large number of LEDs are mounted in a matrix shape. The LED video display device further includes a constant-voltage supplying section, a screen controller and a drive circuit for the LED display units. The constant-voltage supplying section supplies power for respective LEDs mounted on the plural LED display units. The screen controller is configured to perform a light-emission control of respective LEDs by sending PWM instructions to each of the plural LED display units and adjusting a current passing each of the plural LEDs. The drive circuit for the LED display units is composed of a switching circuit and a switch control section. The switching circuit is composed of switches connected to the LEDs in series, respectively. The switch control section is configured to perform an ON/OFF control on the LEDs in response to the PWM instructions. The switch control section is configured to change the duration of a pulse for turning each LED on based on the PWM instructions and adjust the peak-time width of the current which is supplied by the constant-voltage supplying section and passes the LED display units. FIGS. 19A to 19C illustrate examples of operations of the LED video display device. FIG. 19A illustrates an example that one 20-millisecond light emitting period includes one 10-millisecond pulse for turning each LED on, FIG. 19B illustrates an example that one 20-millisecond light emitting period includes two 5-millisecond pulses for turning each LED on, and FIG. 19C illustrates an example that one 20-millisecond light emitting period includes five 2-millisecond pulses for turning each LED on.

Regarding backlight units for use in liquid crystal display devices, a replacement of a CCFL with LEDs is now proceeding. However, phenomenon which did not cause large troubles in CCFL-type backlight units can make large troubles in LED-type backlight units as described below.

On dimming a backlight unit by using a PWM signal, there are caused repeats of a steep increase and decrease of a current which passes a load connected to the output end of the light-emitting element drive circuit, which makes ripples in both of the output current and the output voltage of a DC/DC converter in a light-emitting element driving circuit.

Many of light-emitting element driving circuits employ a ceramic capacitor which is made of a piezoelectric material. Therefore, when ripples appear in a voltage to be applied to the capacitor, the capacitor vibrates and makes acoustic noise, which is a property of piezoelectric materials. Especially, since the frequency of a PWM signal to be used for the dimming falls in the human audible frequency range in many cases, the acoustic noise coming from the capacitor can cause a large problem.

In view the problem, many methods to shift the frequency of the PWM signal away from the human audible frequency range can be considered. However, if the frequency of the PWM signal decreases, a screen flicker can be observed by human eyes on the dimming, which is not preferable. On the other hand, if the frequency of the PWM signal increases, a circuit which can work at high speed is required and such a circuit causes an increase of cost, which is not preferable, too.

Further, the structure of JP-A No. 2012-15369 can make a variation of a current smaller in comparison with the case that all the LED arrays are driven at the same time, and can restrict the acoustic noise. However, since the frequency and the cycle of the PWM signal for dimming LEDs are constant and an influence of the component of a certain frequency strongly becomes large, acoustic noise is perceived by users.

In the structure of JP-A No. 2011-138666, a dummy signal generated based on a PWM signal is applied to a dummy load connected in parallel with the LEDs during a period that LEDs are turned off by a dimming operation using a PWM signal, so as to reduce the number of times of fluctuations of a voltage on a DC/DC output section to be applied to an anode. This structure restricts overall fluctuations of the current and shifts the frequency of the acoustic noise to be lower than the human audible frequency range, which can restrict the acoustic noise. However, this structure increases the area of the t-emitting element driving circuit because of the dummy load, and hardly restricts its electricity consumption on dimming the LEDs. Further, in order to keep the voltage of the DC/DC output section in this structure, it is required that a current which is equivalent to the current passing the LEDs is supplied to the DC/DC output section. Therefore, the electricity consumption increases with corresponding to an increase of the number of LEDs, and the area of the dummy load also increases in order to restrict a heat generation. As for the acoustic noise, high-frequency noise having frequencies each being an odd multiple of the original frequency are mainly perceived by users, which means that acoustic noise in the human audible frequency range is generated finally.

The structure of JP-A No. 2011-242570 is configured to detect the loudness of the acoustic noise and selects the frequency of the PWM signal according to the detected loudness. However, the structure uses only given frequencies and a selected frequency from among the given frequencies does not always work on the acoustic noise generated depending on the shape of the light-emitting element driving circuit and the way to arrange the light-emitting element driving circuit.

The present invention seeks to solve the above-described problems.

SUMMARY

There are disclosed illustrative light-emitting element driving circuits, each of which can effectively restrict acoustic noise generated by a light-emitting element driving circuit on PWM dimming without consuming additional electricity, and illustrative display devices, as embodiments of the present invention.

An embodiment illustrating one aspect of the present invention is a light-emitting element driving circuit for controlling luminance of light-emitting elements (for dimming light-emitting elements) by using a PWM signal. The light-emitting element driving circuit comprises: a control circuit configured to generate a control signal based on an input PWM signal in which ON-periods alternate with OFF-periods to form pulses, and a light-emitting element drive unit configured to drive the plurality of light-emitting elements by using the control signal. The control signal includes alternating first periods and second periods, where the first periods and the second periods correspond to the ON-periods and the OFF-periods of the input PWM signal, respectively. Each of the first periods includes an ON-period, and each of the second period includes an ON-period. The control signal includes a larger number of frequency components in comparison with frequency components of the input PWM signal.

Another embodiment illustrating one aspect of the present invention is the light-emitting element driving circuit including the following structure. The control circuit is configured to generate a delayed PWM signal by delaying ON-periods of one of the input PWM signal (also referred as a through PWM signal, which is the input PWM signal passing through elements without being processed) and an inverted PWM signal which is generated by inverting the input PWM signal. The control circuit is configured to further generate a divided signal based on the one of the input PWM signal (the through PWM signal) and the inverted PWM signal, and on the delayed PWM signal, where the divided signal includes a plurality of pulses which are smaller in width than pulses of the one of the input PWM signal and the inverted PWM signal. The control circuit is configured to generate a composite control signal by combining the divided signal and the one of the input PWM signal (the through PWM signal) and the inverted PWM signal so as to alternate periodically, and output one of the composite control signal and an inverted signal generated by inverting the composite control signal, as the control signal. The light-emitting element driving unit is configured to drive the plurality of light-emitting elements by using the control signal.

Another embodiment illustrating one aspect of the present invention is the light-emitting element driving circuit including the following structure. The control circuit is configured to generate a divided ON-period signal by dividing the ON-periods of the input PWM signal and a divided OFF-period signal by dividing the OFF-periods of the input PWM signal, and generate a composite control signal by combining the divided ON-period signal and the divided OFF-period signal. The control circuit is configured to output one of the composite control signal and an inverted signal generated by inverting the composite control signal, as the control signal. The light-emitting element driving unit is configured to drive the plurality of light-emitting elements by using the control signal.

Other features of illustrative embodiments will be described below.

BRIEF DESCRIPTION OF THE DRAWINGS

Embodiments will now be described, by way of example only, with reference to the accompanying drawings which are meant to be exemplary, not limiting, and wherein like elements numbered alike in several figures, in which:

FIGS. 17A to 17C are timing charts illustrating a related art (JP-A No. 2012-15369);

DETAILED DESCRIPTION

Illustrative embodiments of light-emitting element driving circuit and display devices will be described below with reference to the drawings. It will be appreciated by those of ordinary skill in the art that the description given herein with respect to those figures is for exemplary purposes only and is not intended in any way to limit the scope of potential embodiments may be resolved by referring to the appended claims.

The illustrative light-emitting element driving circuits and display devices as the embodiment of the present invention can effectively restrict acoustic noise of the light-emitting element driving circuit on performing PWM dimming because of the following reason.

There is provided a circuit which is configured to generate a control signal having the larger number of frequency components than the input PWM signal, before the light-emitting element drive unit as a dimming control part of the light-emitting element driving circuit. The light-emitting element driving circuit generates a signal to perform dimming the light-emitting elements by using the control signal, so as to restrict an influence of frequency components in a certain frequency range, change the characteristics of the acoustic noise and make the acoustic noise hardly audible.

As illustrated in the descriptions of background, the replacement of a CCFL with LEDs in backlight units for use in liquid crystal display devices is now proceeding. However, LED-type backlight units cause a problem that the light-emitting element driving circuit generates acoustic noise on performing a PWM dimming. In view of the problem, various measures have been proposed, but any of the measures have not effectively restricted the acoustic noise.

An embodiment of the present invention uses, when dimming light-emitting elements by using a PWM signal, a control signal for dimming the light-emitting elements, where the number of frequency components of the control signal is greater than that of the input PWM signal. Thereby, the variations of a current passing the light-emitting element driving circuit provides various frequency components, which reduces the influence of a frequency component in a certain frequency range and makes the acoustic noise hardly audible.

EXAMPLE 1

A light-emitting element driving circuit and a display device of Example 1 will be described below with referring to FIGS. 2 to 9, to illustrate the above-described embodiments further more in detail.

Figure 1:
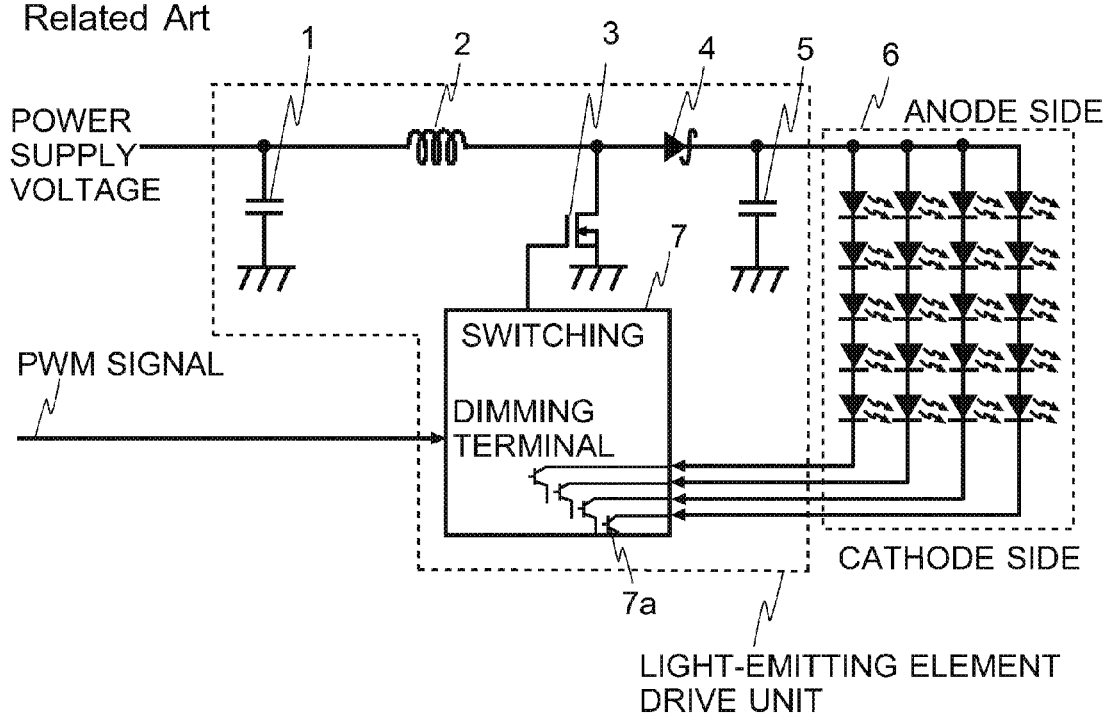
FIG. 1 is a diagram illustrating a structure of a general light-emitting element driving circuit.
Figure 2:
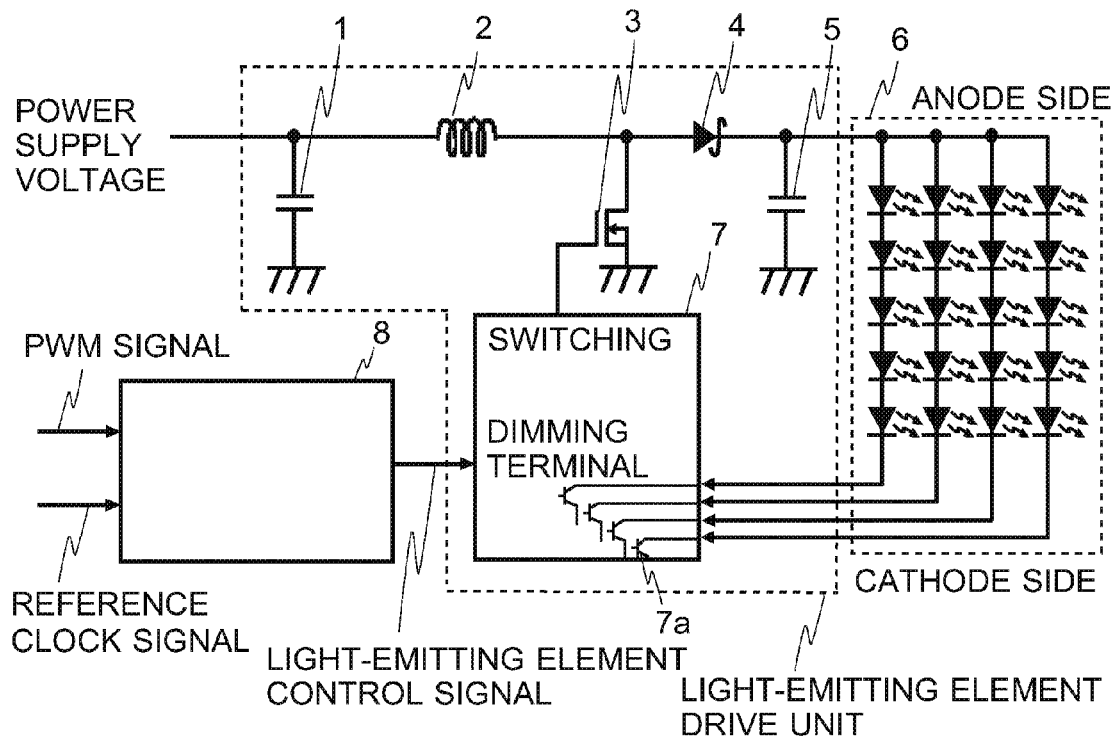
FIG. 2 is a diagram illustrating a structure of a light-emitting element driving unit relating to Examples 1, 2 and 3.

FIG. 2 is a diagram illustrating a structural example of a light-emitting element driving circuit of Example 1 (and of Examples 2 and 3). The light-emitting element driving circuit is composed of light-emitting element control circuit 8 and a light-emitting element drive unit. The difference of the light-emitting element driving circuit from a general light-emitting element driving circuit shown in FIG. 1 is that there is provided light-emitting element control circuit 8 at a position before a dimming terminal of LED driver IC 7. In the structure, a PWM signal and a reference clock signal are inputted into light-emitting element control circuit 8, and light-emitting element control circuit 8 generates a control signal (referred as a light-emitting element control signal) which has a greater number of frequency components than those of the PWM signal to be inputted and the light-emitting element driving circuit performs dimming the light-emitting elements with the LED driver IC 7 by using the light-emitting element control signal as a dimming signal so as to make the acoustic noise hardly audible.

Figure 3:
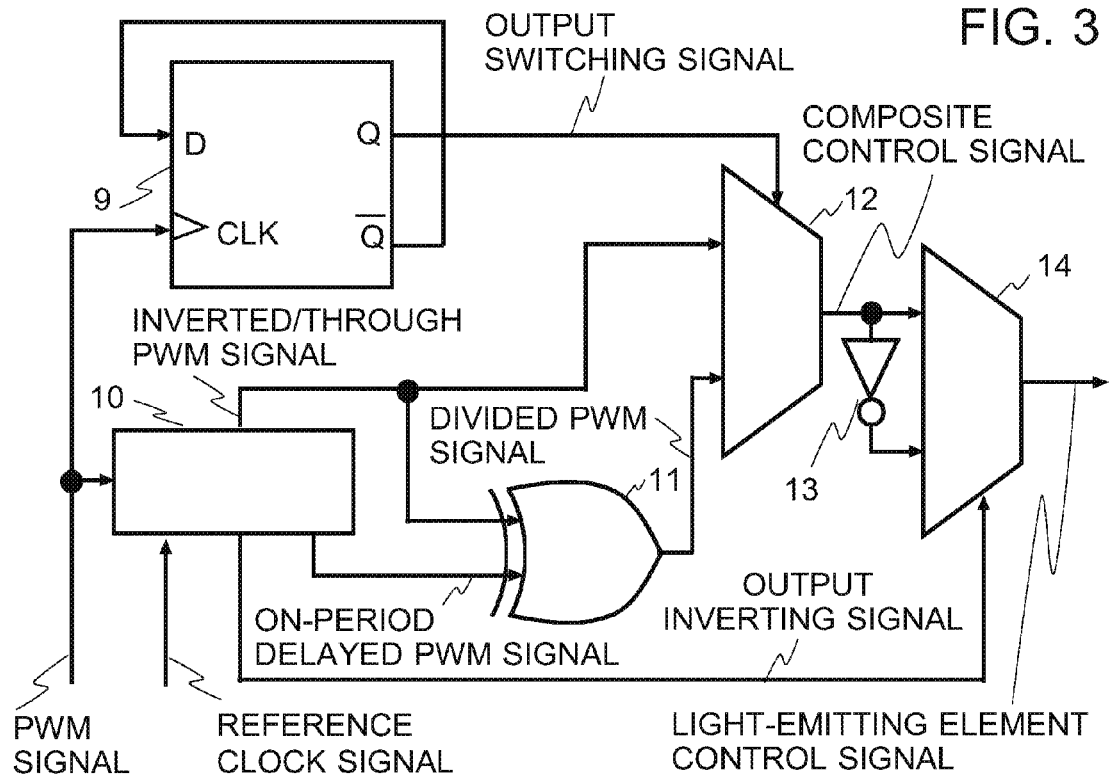
FIG. 3 is a diagram illustrating a structure of a light-emitting element control circuit included in the light-emitting element driving circuit of Example 1.

FIG. 3 is a diagram illustrating an example of a structure of the light-emitting element control circuit 8. Input signals are a PWM signal and a reference clock signal, and an output signal is a light-emitting element control signal, in this structure. The t-emitting element control circuit 8 is composed of, for example, a delay flip-flop 9 configured to generate an output switching signal, dimming signal determining section 10 configured to generate an output inverting signal, XOR circuit 11 configured to output a divided signal (referred as a divided PWM signal) whose pulse width is smaller than that of the input PWM signal, selecting circuit 12 configured to select one of input signals according to the output switching signal and to output a composite control signal, NOT circuit 13 configured to output a signal generated by inverting the composite control signal, and selecting circuit 14 configured to select one of input signals according to the output inverting signal and to output a light-emitting element control signal.

Figure 4:
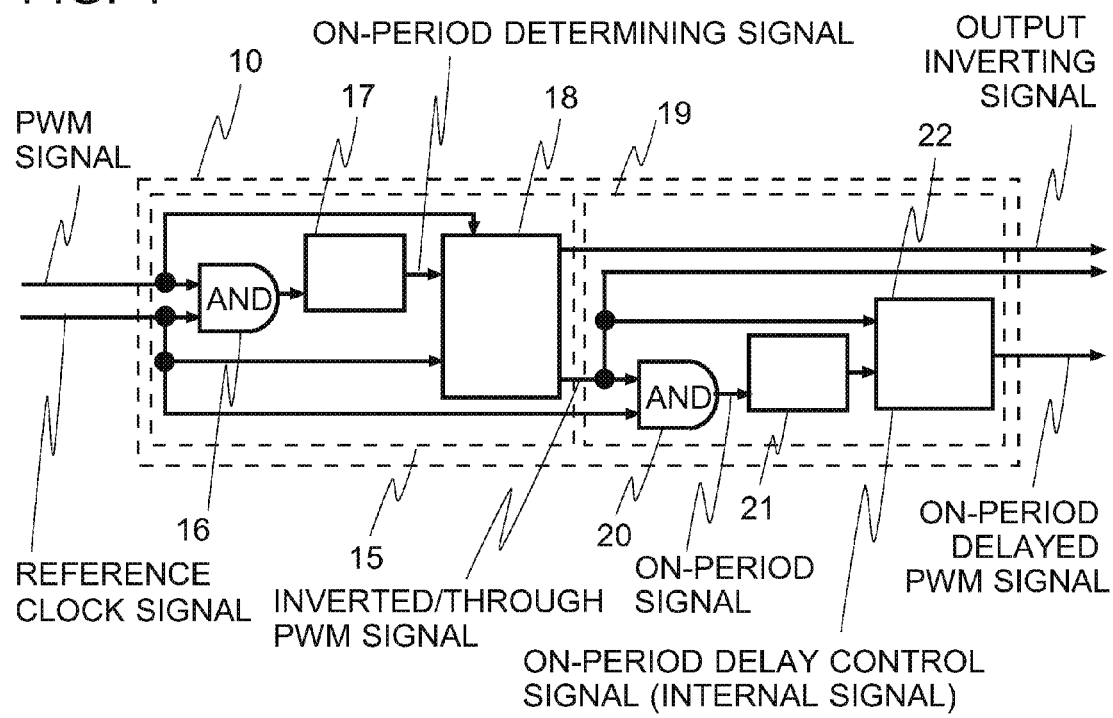
FIG. 4 is a diagram illustrating a structure of a dimming signal determining section included in the light-emitting element control circuit of Example 1.

FIG. 4 is a diagram illustrating a structural example of the dimming signal determining section 10. Input signals are a PWM signal and a reference clock signal and an output signals are the output inverting signal, a delayed PWM signal (referred as a ON-period delayed PWM signal) provided by delaying the ON-periods of the PWM signal and an inverted/through PWM signal. Dimming signal determining section 10 includes ON-period determining section 15 and ON-period delaying section 19. ON-period determining section 15 is composed of, for example, AND circuit 16 and ON-period counter 17 both configured to count the number of clocks regarding the PWM signal, and ON-period determining circuit 18 configured to determine the ON-periods of the PWM signal. ON-period delaying section 19 is composed of, for example, AND circuit 20 and ON-period delay counter 21 both configured to count the number of clocks regarding the inverted/through PWM signal and ON-period delaying circuit 22 configured to generate ON-period delay control signal and to output the signal as an ON-period delayed PWM signal.

Hereinafter, operations, inputs and outputs in dimming signal determining section 10 shown in FIG. 4 will be described, and then, operations using the above outputs and outputs in light-emitting element control circuit 8 shown in FIG. 3 will be described.

Figure 7:
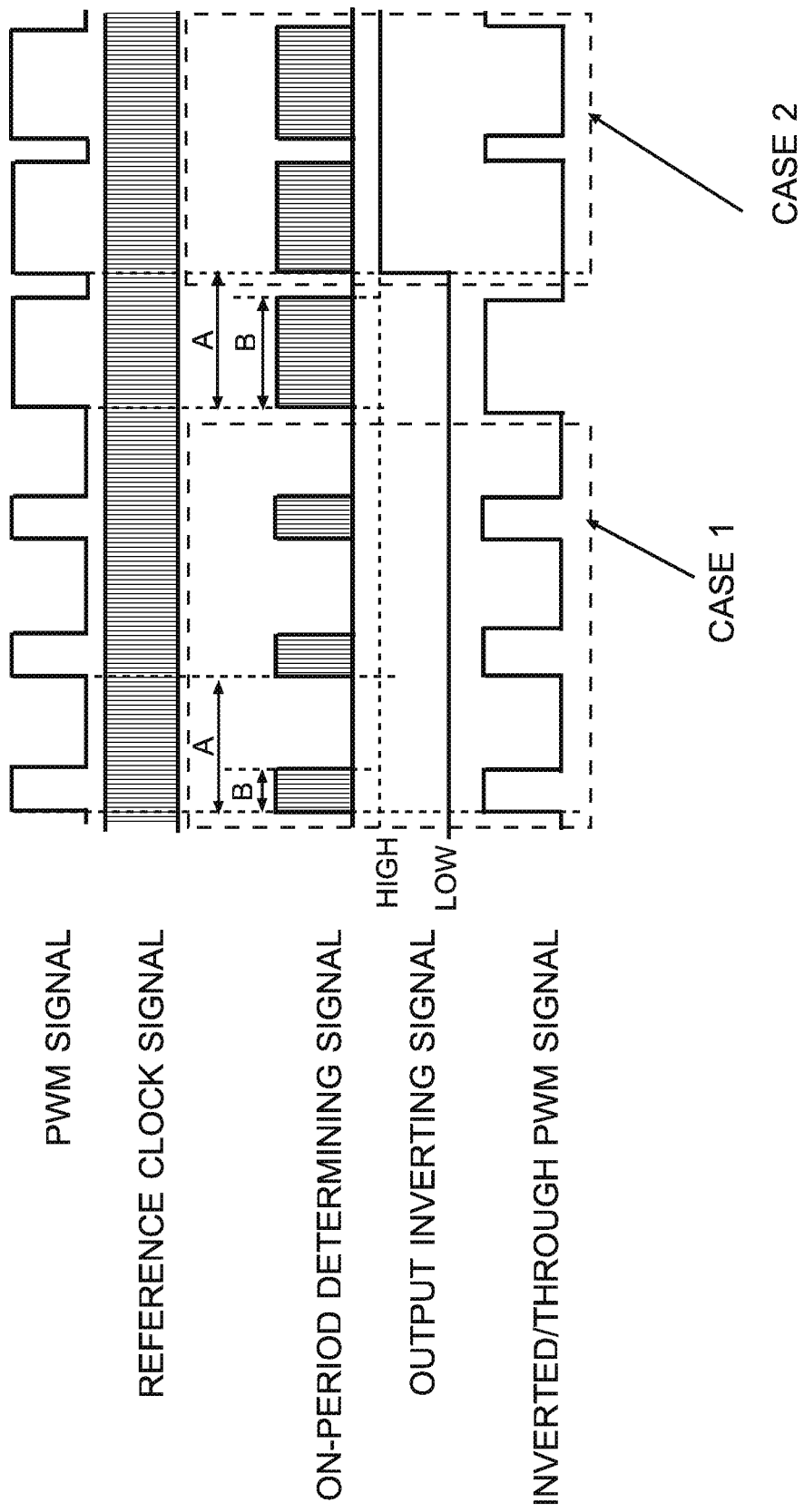
FIG. 7 is a timing chart illustrating operations of an ON-period cycle determining section included in the dimming signal determining section of Example 1.

FIG. 7 illustrates waveforms of various signals used in operations of ON-period determining section 15 which is included in dimming signal determining section 10 in FIG. 4. In the following descriptions, it is assumed that a determination whether to set the output inverting signal to be High or Low and a selection of one of a through PWM signal and an inverted PWM signal as the output signal is conducted based on a determination whether the ratio of one ON-period to one cycle of the PWM signal is less than a predetermined threshold (60% in this example) or not. An arbitrary value may be used for the threshold.

ON-period counter 17 counts up the number of clocks regarding the PWM signal with AND circuit 16 based on the PWM signal and a reference clock signal. The number of clocks for one cycle is detected based on an interval of two rise edges of pulses of the PWM signal. When the counted clock number for one cycle and the counted clock number for the ON-period of the PWM signal are assumed as A and B, respectively, as shown in the ON-period determining signal in FIG. 7, ON-period determining circuit 18 determines whether the ratio of B to A exceeds the threshold of 60% or not. When the ratio is less than 60% (in CASE 1 of FIG. 7), ON-period determining circuit 18 outputs the output inverting signal to be LOW and outputs a through PWM signal without processing the PWM signal. When the ratio is 60% or more (in CASE 2 of FIG. 7), ON-period determining circuit 18 outputs the output inverting signal to be HIGH and outputs an inverted PWM signal after inverting the PWM signal.

Figure 8:
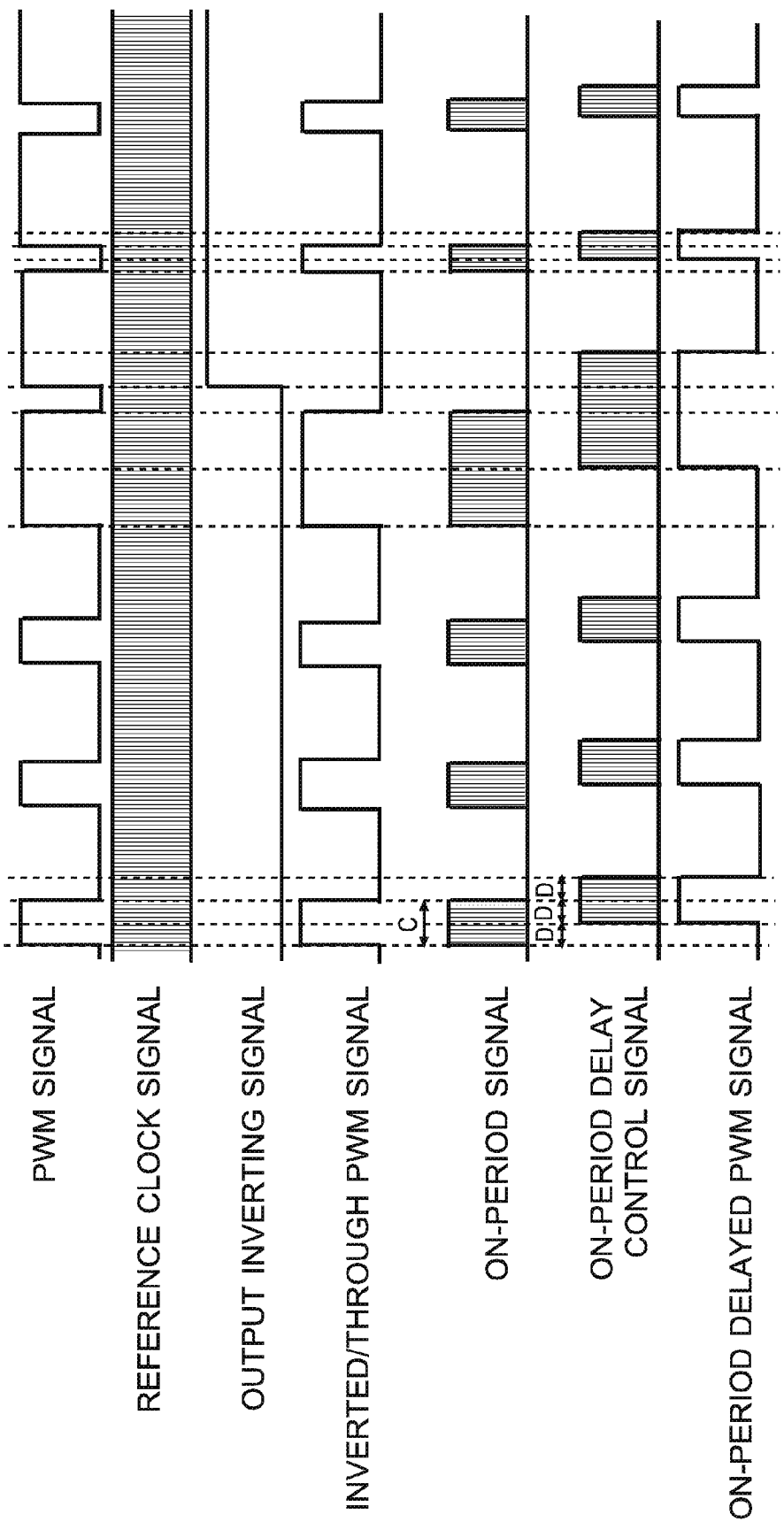
FIG. 8 is a timing chart illustrating operations of an ON-period delaying section included in the dimming signal determining section of Example 1.

FIG. 8 illustrates waveforms of various signals used in operations of ON-period delaying section 19 which is included in dimming signal determining section 10 in FIG. 4. FIG. 8 additionally illustrates a waveform of the PWM signal for an easy understanding of other waveforms.

AND circuit 20 generates an ON-period signal based on the inverted/through PWM signal as the output of ON-period determining circuit 18 and on a reference clock signal. ON-period delay counter 21 counts up the number of clocks regarding the inverted/through PWM signal by using the ON-period signal. It is assumed that the counted clock number of the inverted/through PWM signal and the half of the counted clock number are C and D, respectively. ON-period delaying circuit 22 generates an ON-period delay control signal which is delayed by the time corresponding to the counted clock number D, by using the ON-period signal. Then, ON-period delaying circuit 22 performs shaping on the waveform of the generated signal and outputs the processed signal as an ON-period delayed PWM signal.

Next, operations of light-emitting element control circuit 8 shown in FIG. 3 will be described below.

A PWM signal is inputted into delay flip-flop 9 and dimming signal determining section 10. Delay flip-flop 9 performs a toggled flip-flop operation by using the PWM signal as a clock, and outputs an output switching signal.

Dimming signal determining section 10, as described above, switches its output signal between a through PWM signal provided by outputting the input PWM signal as it is and an inverted PWM signal provided by inverting the input PWM signal, according to the ON-periods of the PWM signal. Dimming signal determining section 10 further counts the number of clocks for the ON-period of the through PWM signal and the number of clocks for the ON-period of the inverted PWM signal by using a reference clock signal whose cycle is as small as a tolerance of the counted number is not perceived as a change of luminance of the light-emitting devices by users. Then, dimming signal determining section 10 outputs an ON-period delayed PWM signal provided by delaying each ON-period by a half of the On-period.

XOR circuit 11 generates a divided PWM signal based on the inverted/through PWM signal and ON-period delayed PWM signal, where the pulse width of the divided. PWM signal is smaller than that of the inverted/through PWM signal. Selecting circuit 12 switches the output between the inverted/through PWM signal and the divided PWM signal periodically according to the output switching signal outputted by delay flip-flop 9, to generate a composite control signal.

Selecting circuit 14 switches the output signal between the composite control signal outputted by selecting circuit 12 and inverted signal inverted by NOT circuit 13 to generate a light-emitting element control signal. The selecting circuit 14 outputs the composite control signal without performing any processing under the condition that the ratio of the counted number of clocks for one ON-period of the PWM signal to the number of clocks for one cycle of the PWM signal is less than 60% (the under-60% case). On the other hand, The selecting circuit 14 inverts the composite control signal and outputs the resulting signal under the condition that the ratio of the counted number of clocks for one ON-period of the PWM signal to the number of clocks for one cycle of the PWM signal is 60% or more (the over-60% case).

Figure 5:
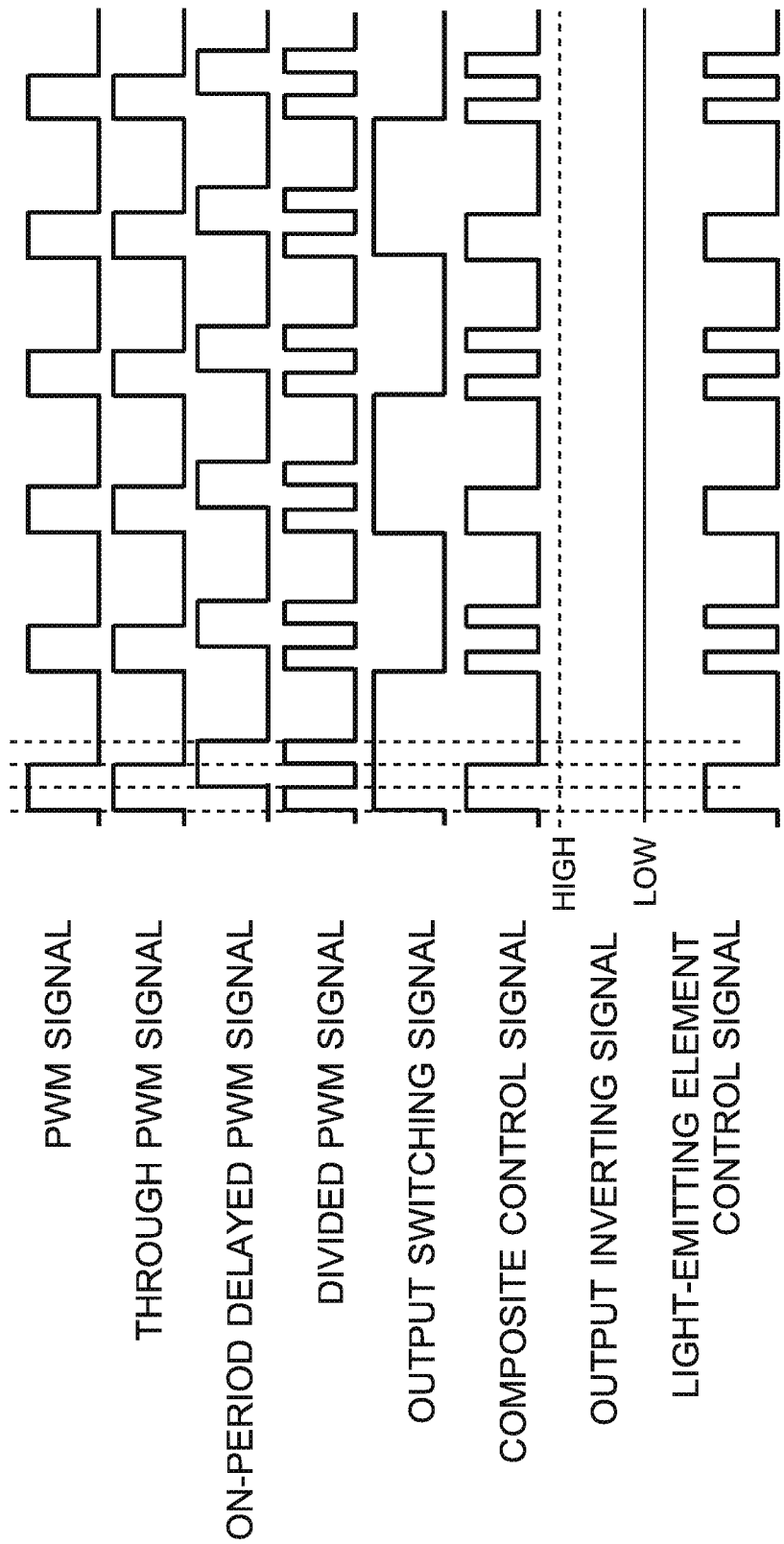
FIG. 5 is a timing chart illustrating waveforms of various signals (under the condition that the ratio of an ON-period to one cycle of the input PWM signal is less than 60%) in the light-emitting element control circuit of Example 1.
Figure 6:
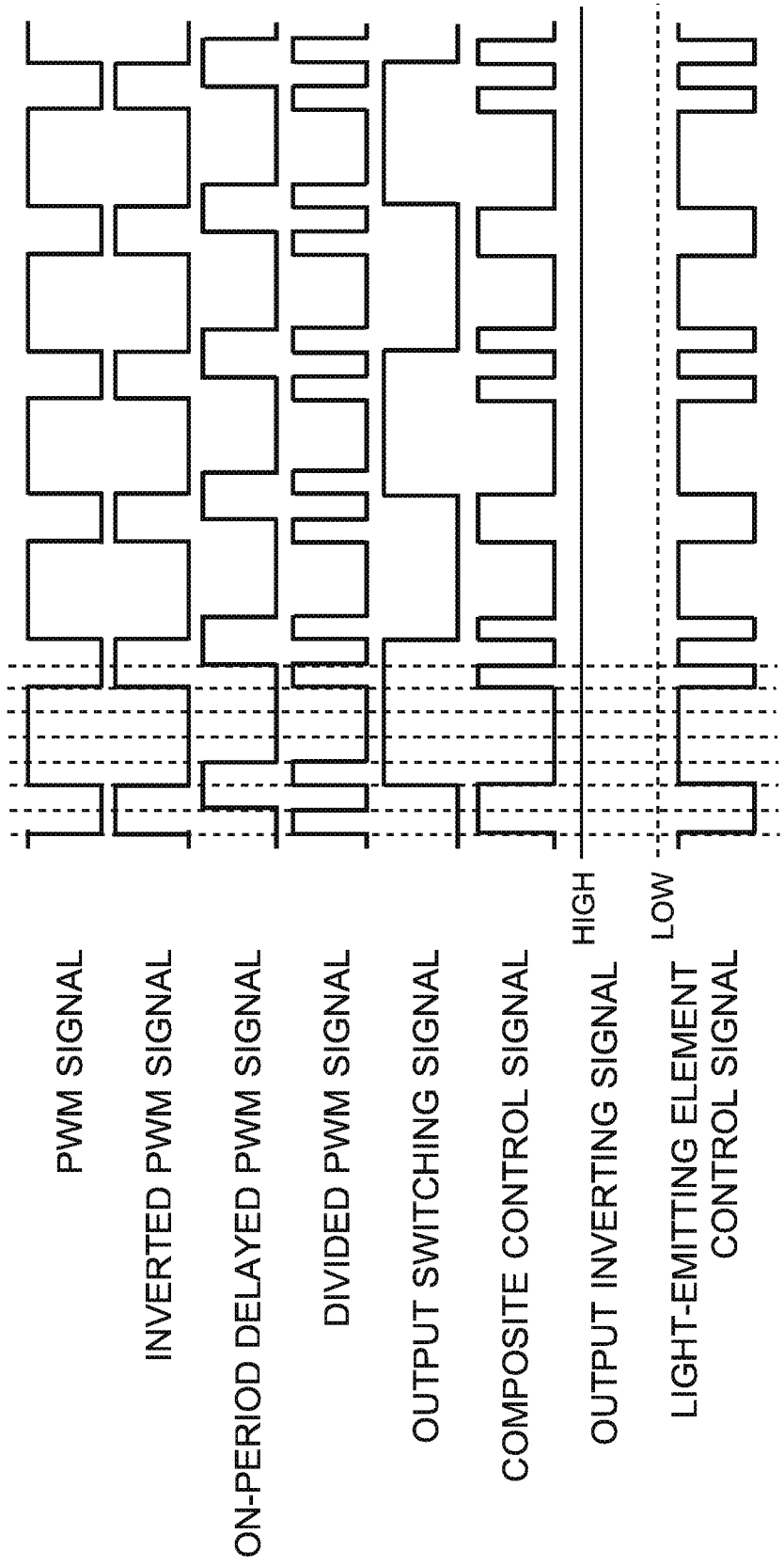
FIG. 6 is a timing chart illustrating waveforms of various signals (under the condition that the ratio of on ON-period to one cycle of the input PWM signal is 60% or more) in the light-emitting element control circuit of Example 1.

FIGS. 5 and 6 illustrate waveforms of internal signals and output signals of the structure of the present example. FIG. 5 shows waveforms of the following signals in the under-60% case. Since the duty ratio is less than 60%, dimming signal determining section 10 outputs a through PWM signal which is the same in waveform as the PWM signal. In the ON-period delayed PWM signal, each ON period is delayed by 50% of the ON period. XOR circuit 11 processes the through PWM signal and the ON-period delayed PWM signal and outputs the divided PWM signal. One of the through PWM signal and divided PWM signal is selected with corresponding to HIGH and LOW states of the output switching signal, and the composite control signal is outputted. In this case, since the duty ratio of the PWM signal is less than 60%, the output inverting signal is set to be LOW. Thereby, the composite control signal is not inverted and is outputted as light-emitting element control signal as it is.

FIG. 6 shows waveforms of the following signals in the over-60% case. Since the duty ratio is 60% or more, dimming signal determining section 10 outputs an inverted PWM signal prepared by inverting the PWM signal. In the ON-period delayed PWM signal, each ON period is delayed by 50% of the ON period. XOR circuit 11 processes the inverted PWM signal and the ON-period delayed PWM signal and outputs the divided PWM signal. One of the inverted PWM signal and divided PWM signal is selected with corresponding to HIGH and LOW states of the output switching signal, and the composite control signal is outputted. In this case, since the duty ratio of the PWM signal is 60% or more, the output inverting signal is set to be HIGH. Thereby, the composed signal is inverted and the resulting signal is outputted as a light-emitting element control signal.

Figure 9:
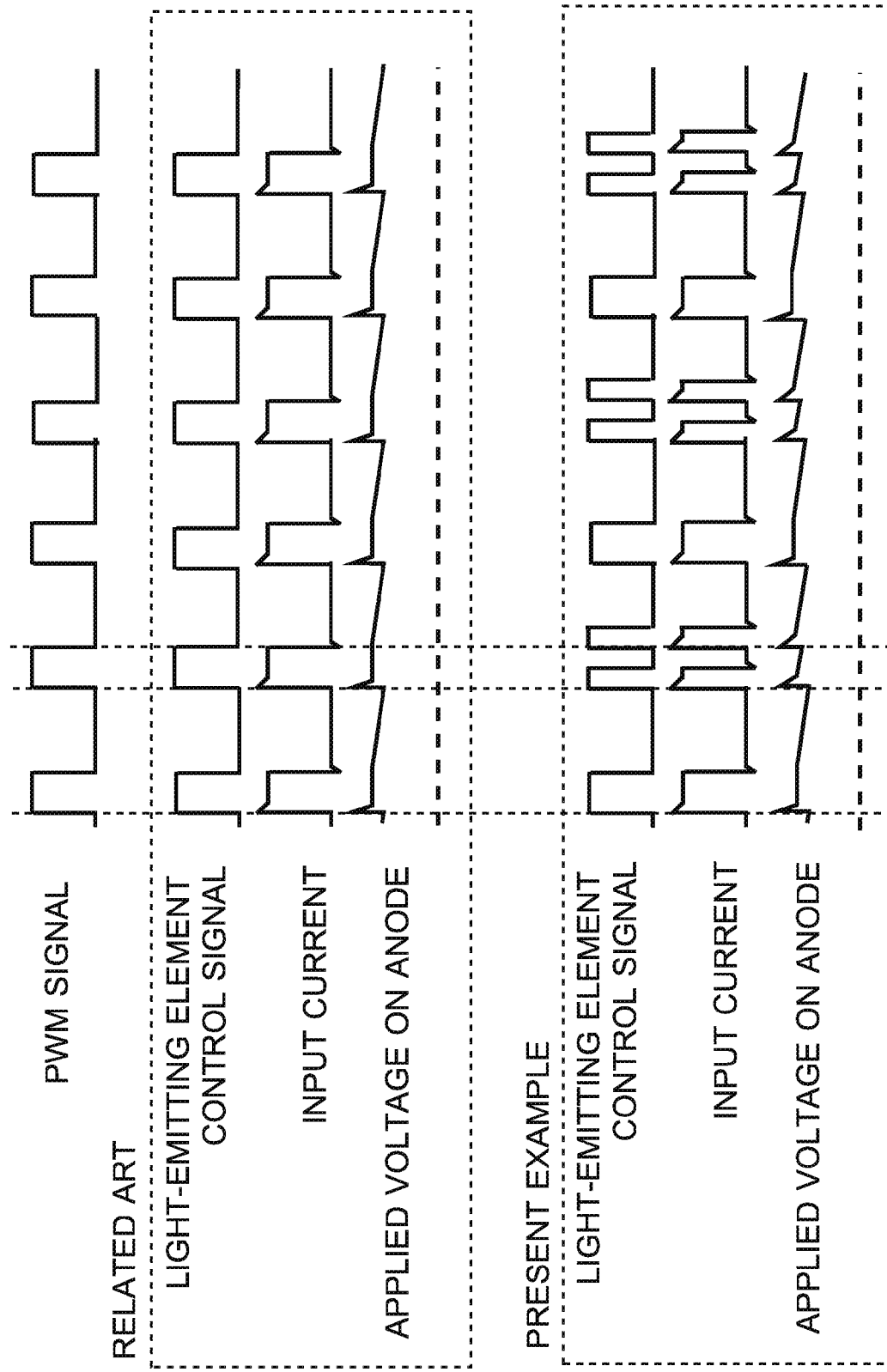
FIG. 9 is a timing chart illustrating an effects of the light-emitting element driving circuit of Example 1.

FIG. 9 illustrates waveforms of the light-emitting element control signal, input current and an applied voltage on the anode, in a related art which does not employ the above-described structure and in the present example. In the related art, each of the input current and the applied voltage on the anode shows overshoots synchronizing with raises of the input PWM signal. On the other hand, since pulses in the PWM signal are partially divided to generate the light emitting element control signal in the present embodiment, which can change the cycle of overshoots which appear in each of the input current and the applied voltage on the anode in comparison with the input PWM signal.

As described above, in Example 1, the light-emitting element control signal has a frequency component being same as the frequency of the original PWM signal, a frequency component being twice the frequency of the original PWM signal and a frequency component being a half of the frequency of the original PWM signal, which causes a greater number of frequency components in comparison with conventional arts. Further, a change in a cycle of dimming of the light-emitting elements changes characteristics of the acoustic noise, which makes users to perceive the acoustic noise hardly.

EXAMPLE 2

Next, a light-emitting element driving circuit and a display device of Example 2 will be described below with referring to FIGS. 10 to 12, to illustrate the above-described embodiments further more in detail. In Example 2, a part being different from Example 1 will be described concretely.

Figure 10:
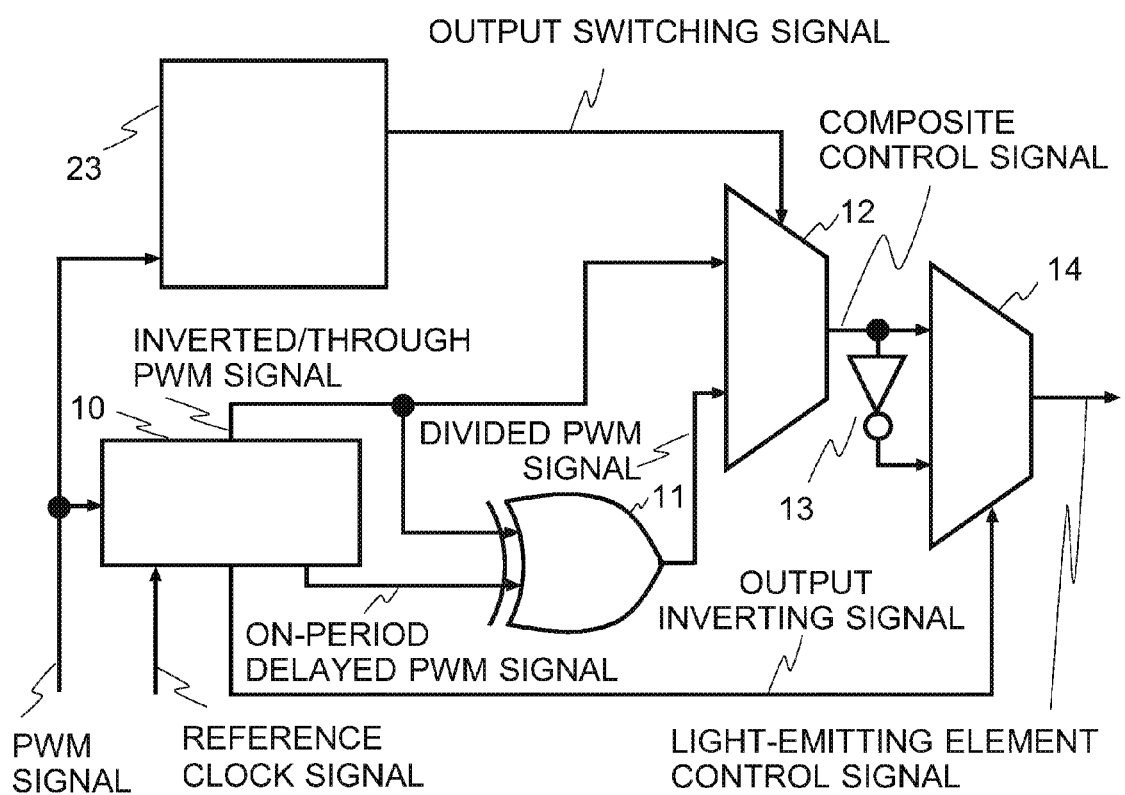
FIG. 10 is a diagram illustrating a structure of a light-emitting element control of Example 2.

FIG. 10 illustrates an example of a structure of light-emitting element driving circuit of Example 2, wherein delay flip-flop 9 which is configured to generate an output switching signal and is shown in FIG. 3 as Example 1 is replaced with output switching signal generating circuit 23. In the present example, output switching signal generating circuit 23 is composed of linear feedback shift registers. FIG. 11 illustrates an example of 4-bit and 5-bit linear feedback shift registers. A linear feedback shift register to be operated may be switched from another as occasion demands. The number of linear feedback shift registers may be three or more, and linear feedback shift registers other than those of 4-bit and 5-bit types may be used.

Figure 11:
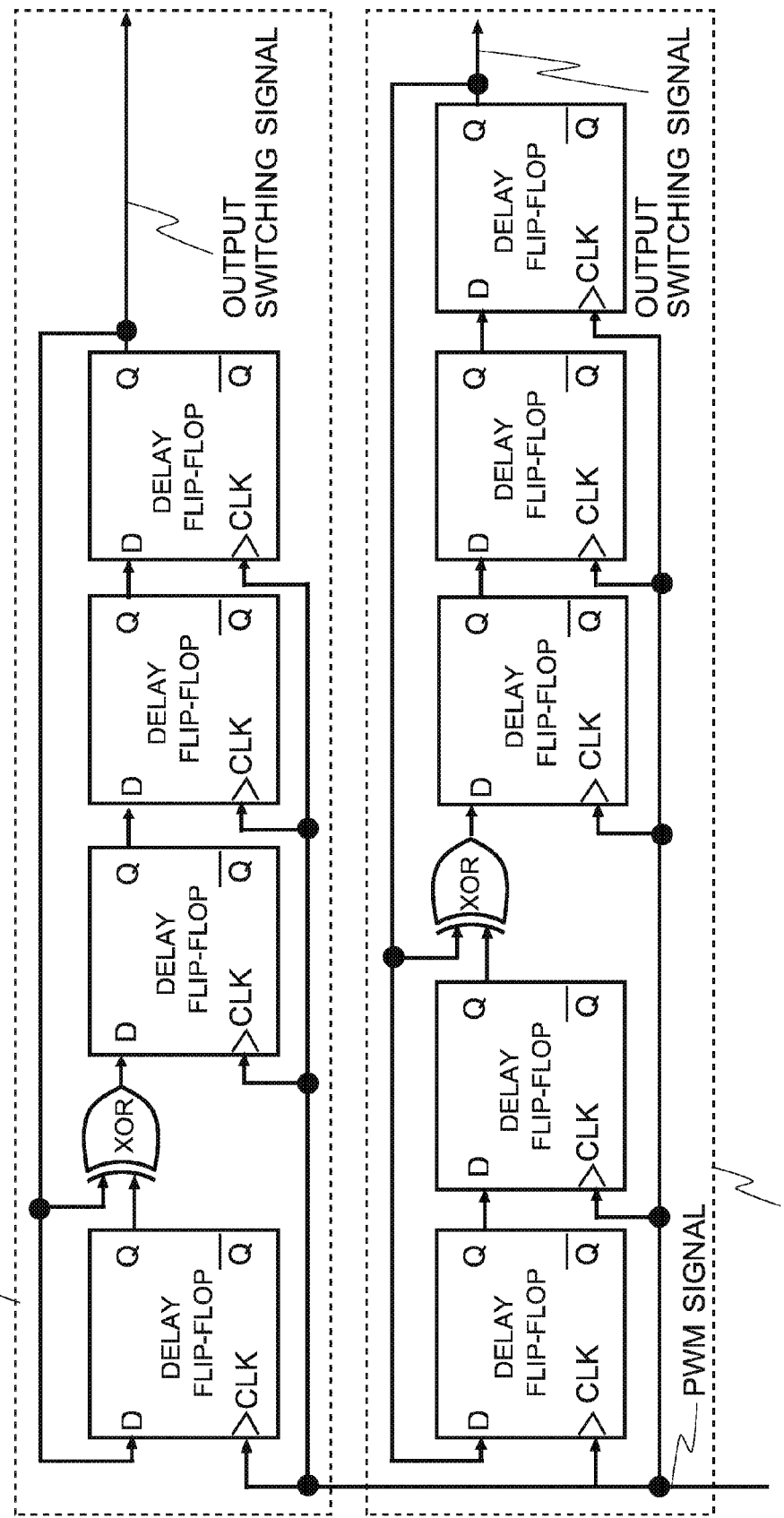
FIG. 11 is a diagram illustrating an example of a structure of an output switching signal generating circuit of Example 2.
Figure 12:
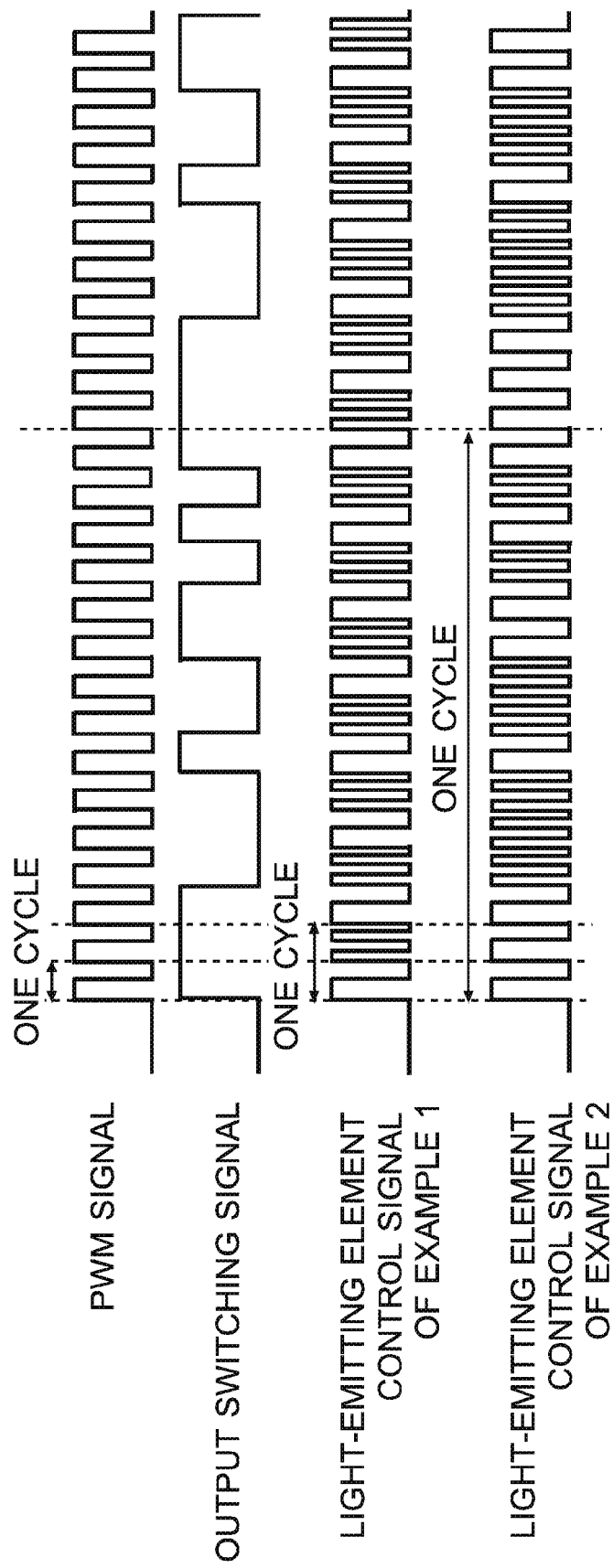
FIG. 12 is a timing chart illustrating a comparison of the light-emitting element control circuits of Examples 1 and 2.

FIG. 12 illustrates waveforms of light-emitting element control signals obtained when the output switching signal generating circuit 23 employs the 4-bit linear feedback shift register shown in FIG. 11. While the structure of Example 1 uses the output switching signal which repeats HIGH and LOW states in alternate cycles, the structure of Example 2 can make a wide variation in cycle of the output switching signal.

By using the above structure of the present example, the cycle of the signals can be selected by a selection of the bit number of the linear feedback shift register, which makes users to perceive the acoustic noise more hardly.

EXAMPLE 3

Next, a light-emitting element driving circuit and a display device of Example 3 will be described below with referring to FIG. 13. In Example 3, a part being different from Example 2 will be described concretely.

Figure 13:
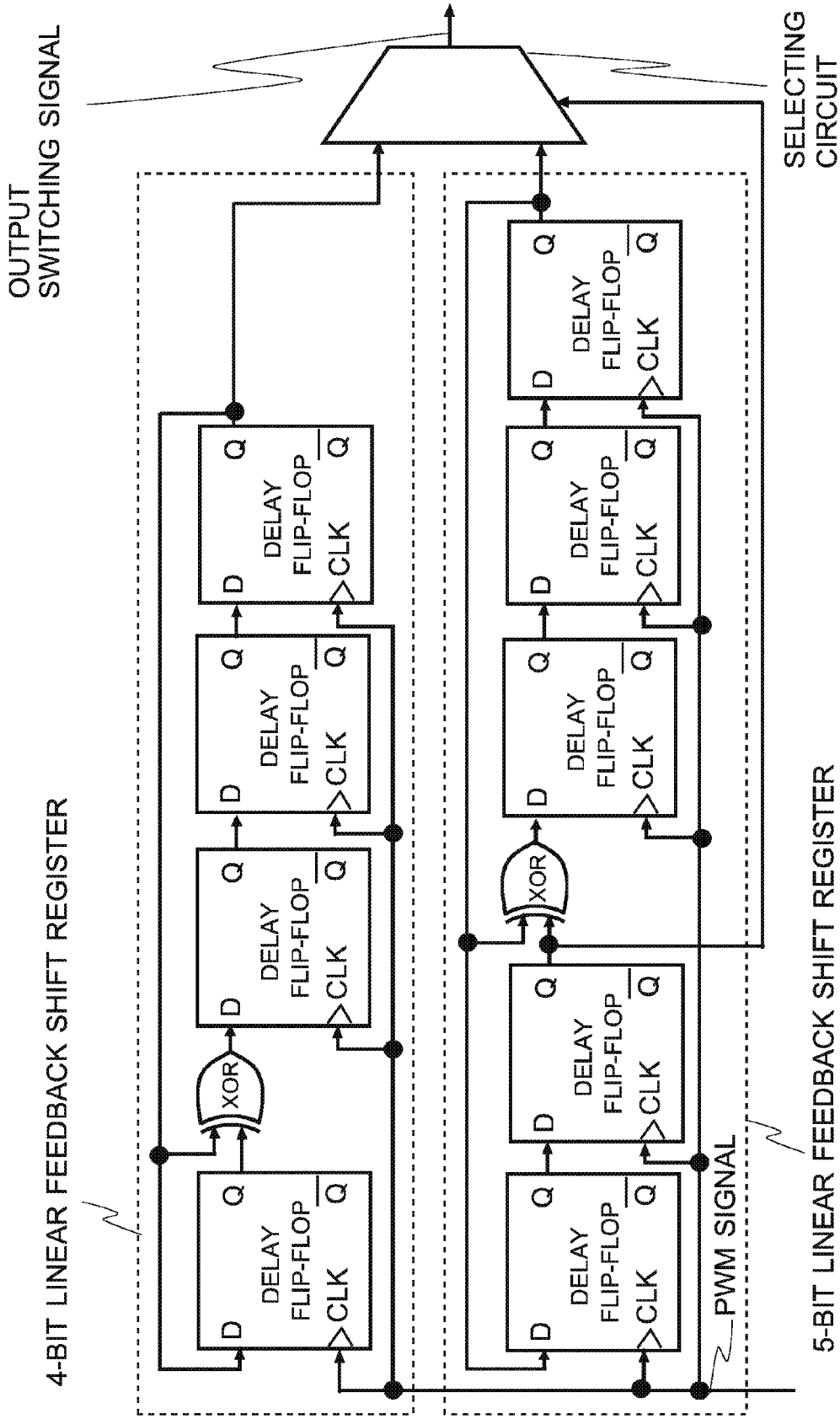
FIG. 13 is a diagram illustrating an example of a structure of an output switching signal generating circuit of Example 3.

FIG. 13 illustrates an example of the output switching signal generating circuit 23 of Example 3. In this example, the output switching signal generating circuit 23 is composed of plural linear feedback shift registers and a selecting circuit configured to select the output signal, where the illustrative plural linear feedback shift registers shown in FIG. 13 are two linear feedback shift registers, in other words, a 4-bit linear feedback shift register and a 5-bit linear feedback shift register. The number of linear feedback shift registers may be three or more, and linear feedback shift registers other than those of 4-bit and 5-bit types may be used.

In Example 3, a selecting circuit is arranged after the linear feedback shift registers. The selecting circuit is configured to select an output switching signal outputted by one of the 4-bit linear feedback shift register and the 5-bit linear feedback shift register based on the signals outputted by the linear feedback shift registers. By this structure, a cycle to alternate the divided signal and the inverted/through PWM signal can be selectably changed, on generating the composite control signal.

By using the above structure in this example, the increased number of cycles can be selected and incorporated into the signals in comparison with the structures of Examples 1 and 2.

EXAMPLE 4

Next, a light-emitting element driving circuit and a display device of Example 4 will be described below with referring to FIGS. 14 to 16.

Figure 14:
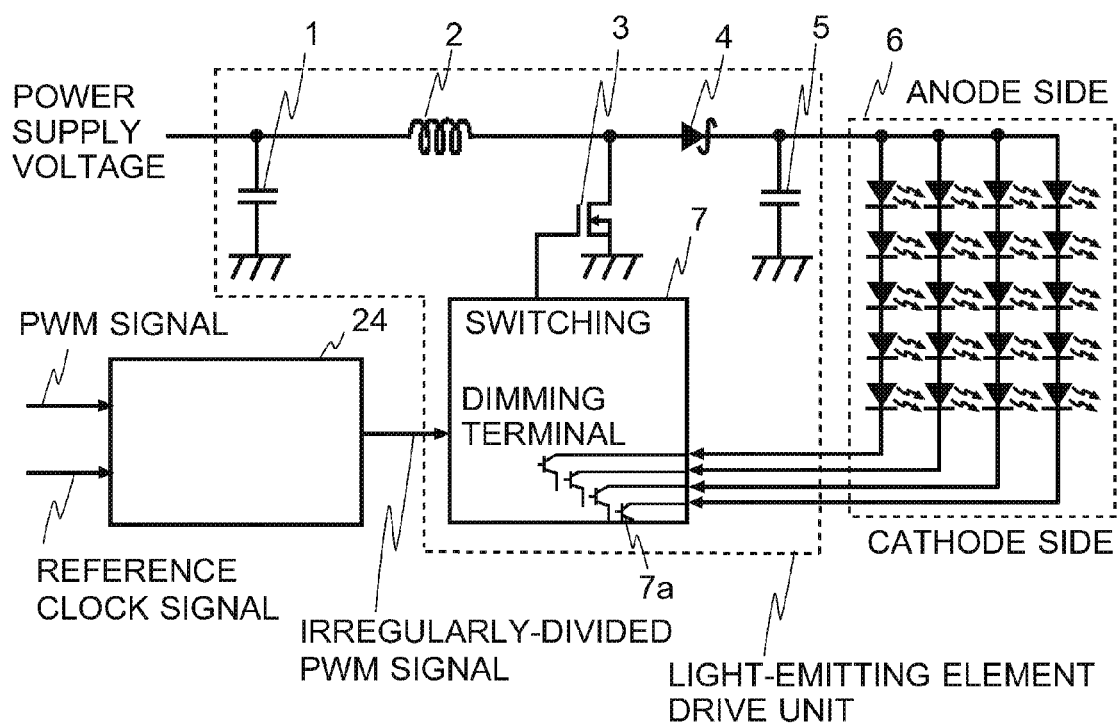
FIG. 14 is a diagram us a structure of a light-emitting element driving circuit of Example 4.

FIG. 14 illustrates an example of a structure of light-emitting element driving circuit of Example 4, wherein light-emitting element control circuit 8 shown in FIG. 2 is replaced with an irregularly-divided PWM signal generating circuit 24.

Figure 15:
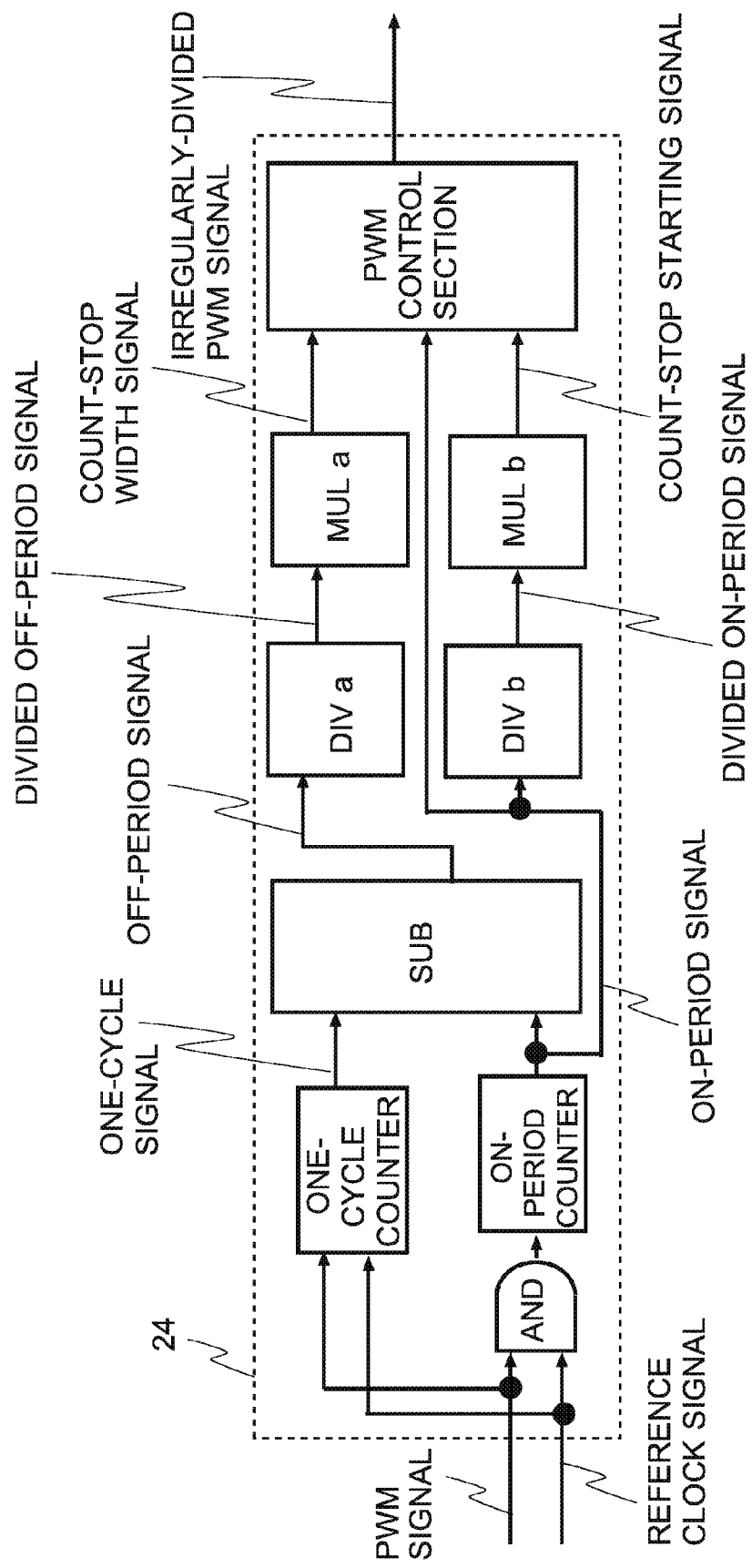
FIG. 15 is a diagram illustrating a structure of a irregularly-divided PWM signal generating circuit included in the light-emitting element driving circuit of Example 4.

FIG. 15 illustrates an example of the structure of irregularly-divided PWM signal generating circuit 24 of Example 4. The irregularly-divided PWM signal generating circuit 24 is composed of, for example, an AND circuit, a one-cycle counter, an ON-period counter, a subtracter (SUB), a divider (DIV) "a", a divider (DIV) "b", a multiplier (MUL) "a", a multiplier (MUL) "b" and a PWM control section. The irregularly-divided PWM signal generating circuit 24 is configured to generate a t-emitting element control signal (referred as an irregularly-divided PWM signal in this example) based on a PWM signal and a reference clock signal.

Figure 16:
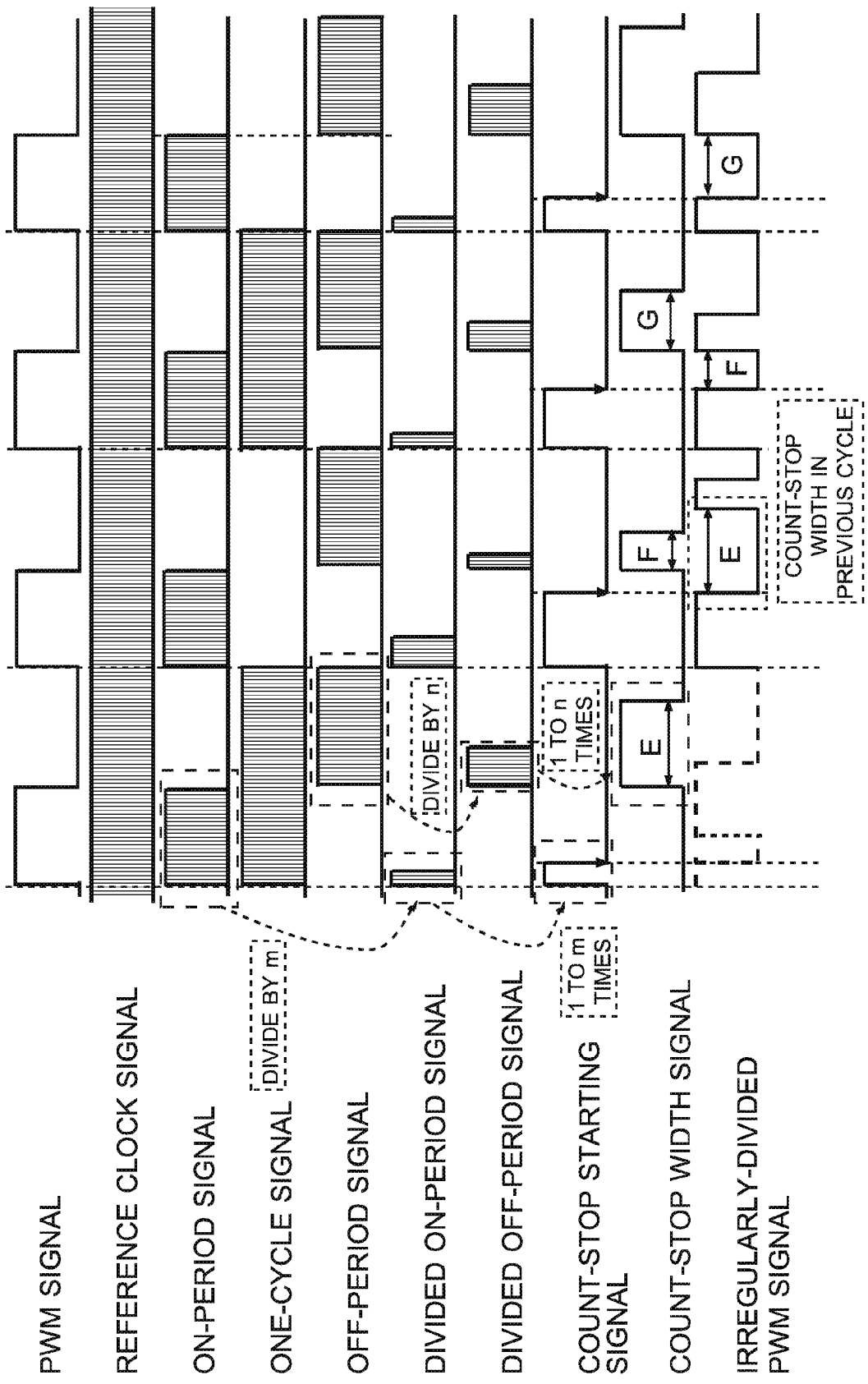
FIG. 16 is a timing chart illustrating waveforms of various signals in the irregularly-divided PWM signal generating circuit of Example 4.
Figures 17B, 17C:
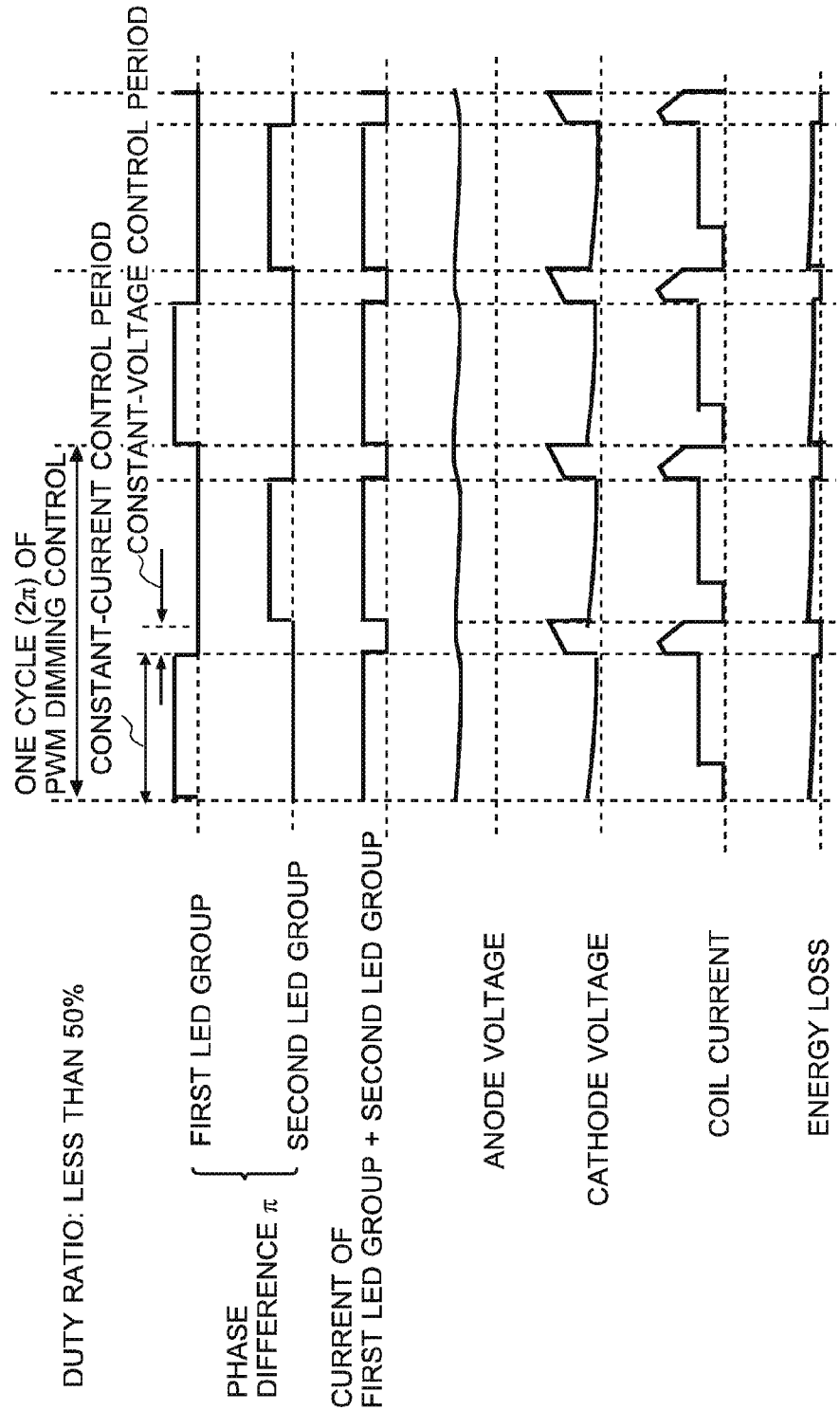
Figure 18:
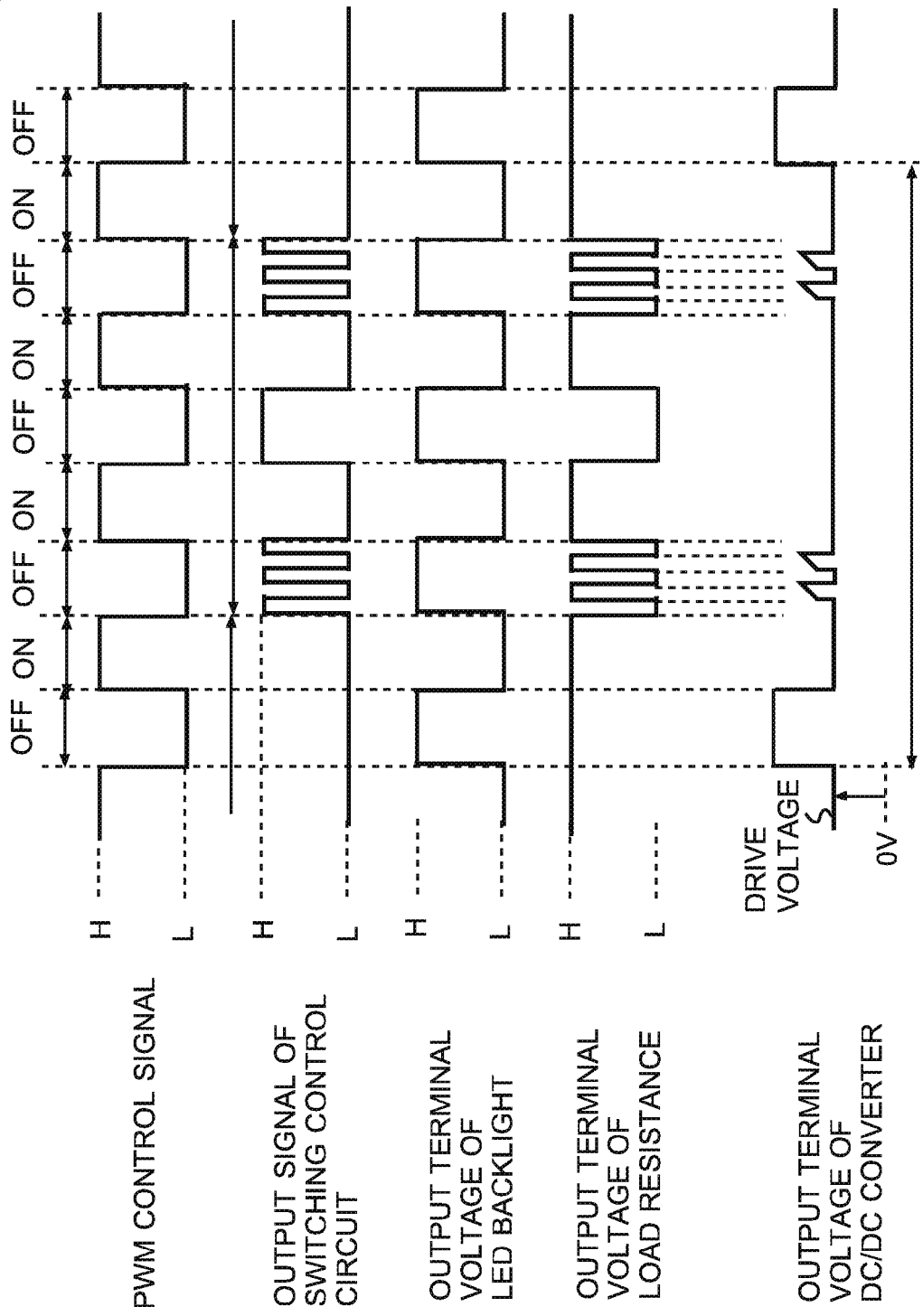
FIG. 18 is a timing chart illustrating a related art (JP-A No. 2011-138666)
Figures 19A, 19B, 19C:
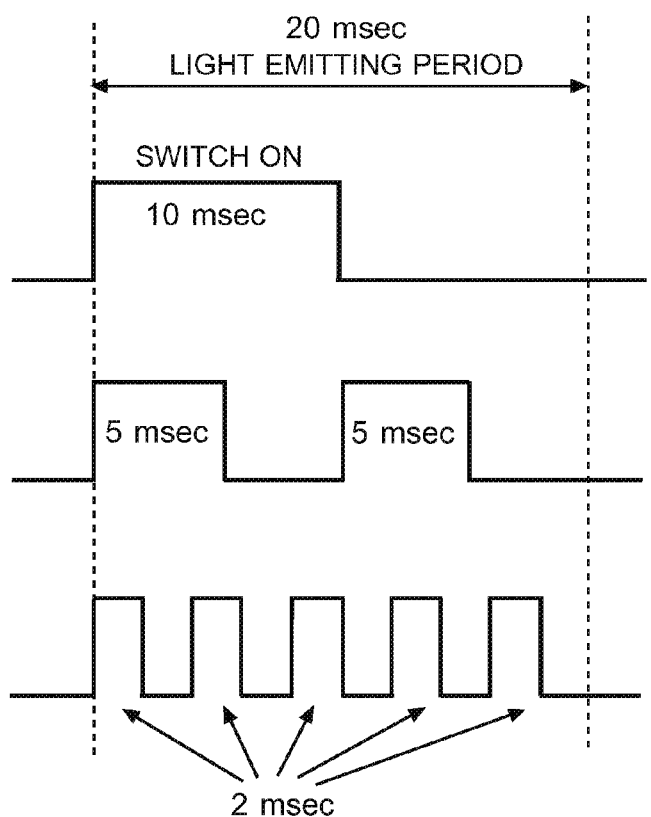
FIGS. 19A to 19C are timing charts illustrating a related art (JP-A No. 2011-242570)

FIG. 16 illustrates waveforms of internal signals and output signals of the circuits obtained by using the structure of the present example. The waveforms of the signals shown in FIG. 16 will be described below.

First, in irregularly-divided PWM signal generating circuit 24, there are generated two types of signals based on a PWM signal and a reference clock signal as input signals. One of the generated signals is a one-cycle signal. The one-cycle counter outputs the one-cycle signal by counting clocks for an interval of two rise edges of pulses in the PWM signal, based on the reference clock signal. The other of the generated signals is an ON-period signal. The AND circuit and the ON-period counter count clocks for the ON-period of the PWM signal, based on the reference clock signal. Then, the subtracter outputs an OFF-period signal based on the one-cycle signal and the ON-period signal.

Then, divider "a" generates a divided OFF-period signal based on the OFF-period signal. The divided OFF-period signal is prepared by dividing the duration of the OFF-period signal into "n" uniform parts. The number of "n" may be determined in previous or may be changed during the operations of the light-emitting element driving circuit.

Divider "b" generates a divided ON-period signal based on the ON-period signal. The divided ON-period signal is prepared by dividing the duration of the ON-period signal into "m" uniform parts. The number of "m" may be determined in previous or may be changed during the operations of the light-emitting element driving circuit. According to the structure, in each of the divided OFF-period signal and the divided ON-period signal, the number of divisions of the pulse width can be changed individually in each cycle.

Multiplier "a" generates a count-stop width signal based on the divided OFF-period signal. The count-stop width signal is prepared by multiplying the duration of the divided OFF-period signal by a value from 1 to n, which may be determined in previous or may be changed during the operations of the light-emitting element driving circuit.

Multiplier "b" generates a count-stop starting signal based on the divided ON-period signal. The count-stop starting signal is prepared by multiplying the duration of the divided ON-period signal by a value from 1 to m, which may be determined in previous or may be changed during the operations of the light-emitting element driving circuit. According to the structure, in each of the divided OFF-period signal and the divided ON-period signal, the factor to multiply the pulse width can be changed individually in each cycle.

The PWM control section generates an irregularly-divided PWM signal based on the count-stop width signal, count-stop starting signal and ON-period signal. The generated irregularly-divided PWM signal is in an ON state during the ON-period of the ON-period signal. The PWM control section stops a counting process for the ON-period of the count-stop width signal, in response to the situation that the count-stop starting signal changes to be ON. After the end of the ON-period of the count-stop width signal, the irregularly-divided PWM signal becomes an ON state again based on the ON-period signal. Under the condition that the factor to multiply the pulse width of the divided OFF-period signal and the factor to multiply the pulse width of the divided ON-period signal are changed during the operations of the light-emitting element driving circuit, the PWM control section uses the ON-period of the count-stop width signal in the previous cycle to generate the irregularly-divided PWM signal.

As shown in FIG. 16, two signal portions of each of E, F and G are the same in width. Further, the total sum of ON periods of the ON-period signal and the total sum of ON periods of the irregularly-divided PWM signal are the same. By dividing the light-emitting element control signal into non-uniform parts in width, the frequency components of the resulting signal which can make the acoustic noise can be dispersed in a wider frequency range.

Figure 20:
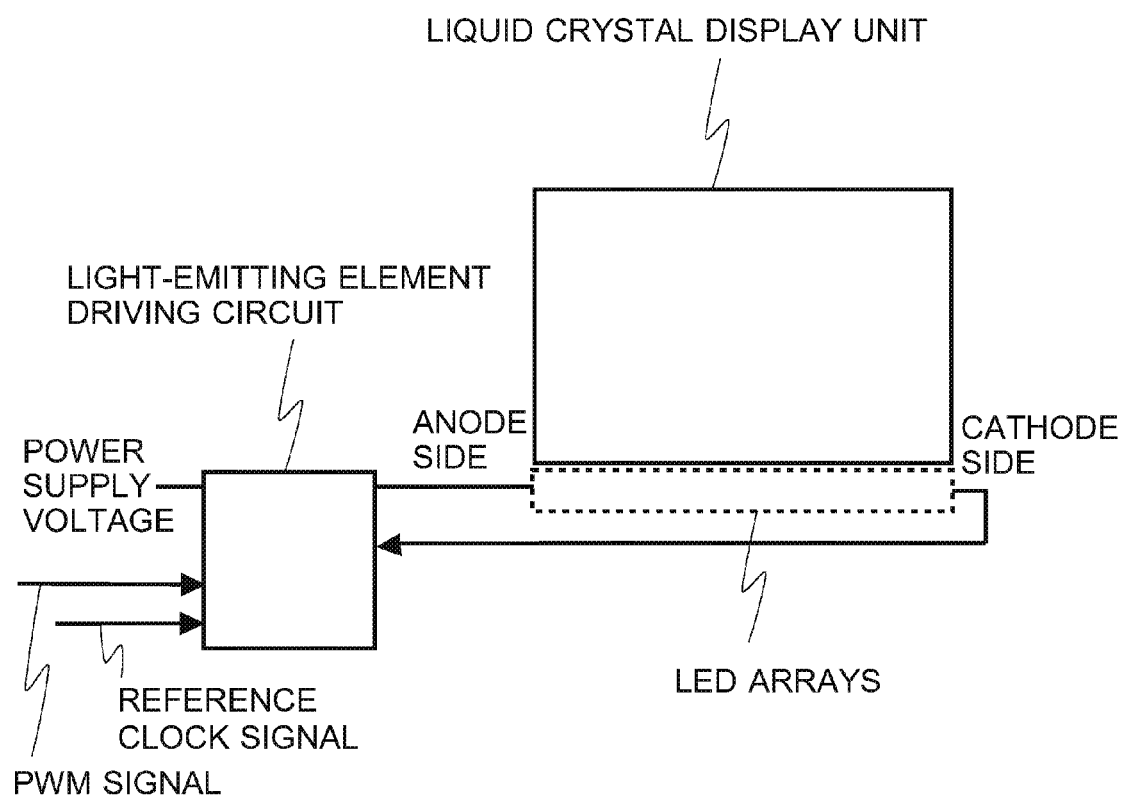
FIG. 20 is a diagram illustrating a display device equipped with the light-emitting element driving circuit relating to the present examples.

FIG. 20 illustrates a diagram of a display device (liquid crystal display device) equipped with a light-emitting element driving circuit as an embodiment of the present invention. The display device receives a power supply voltage, PWM signal, and reference clock signal which are externally inputted, and operates a LED section (LED arrays) to emit light through the above-described light-emitting element driving circuit. The liquid crystal display unit is configured to adjust a degree of light transmission so as to display images thereon.

While the present embodiments of the present invention have been described using specific terms, such description is for illustrative purpose only, and it is to be understood that changes and variations may be made without departing from the spirit or scope of the appended claims.

For example, while all the LED arrays connected in parallel are subjected to the above-described control reflecting the present invention, a part of the LED arrays may be subjected to the control and the way to shift a start of a signal supplied to each of the LED arrays may be used with the above control.

The invention claimed is:

1. A light-emitting element driving circuit for controlling luminance of light-emitting elements by using a PWM signal, the light-emitting element driving circuit comprising:
 a control circuit configured to generate a control signal including a larger number of frequency components in comparison with frequency components of an input PWM signal; and
 a light-emitting element drive unit configured to drive the plurality of light-emitting elements by using the control signal,
 wherein the control circuit is configured to
  generate a delayed PWM signal by delaying ON-periods of one of the input PWM signal and an inverted PWM signal generated by inverting the input PWM signal,
  generate a divided signal based on the one of the input PWM signal and the inverted PWM signal, and on the delayed PWM signal, the divided signal including a plurality of pulses which are smaller in width than pulses of the one of the input PWM signal and the inverted PWM signal,
  generate a composite control signal by combining the divided signal and the one of the input PWM signal and the inverted PWM signal so as to alternate periodically, and
  output one of the composite control signal and an inverted signal generated by inverting the composite control signal, as the control signal.

2. The light-emitting element driving circuit of claim 1, wherein the control circuit comprises a selecting unit configured to determine whether to invert the input PWM signal or not and to determine whether to invert the composite control signal or not.

3. The light-emitting element driving circuit of claim 2, wherein the selecting unit is configured to switch between inverting the input PWM signal and the composite control signal and not inverting the input PWM signal and the composite control signal, in response to detecting that a ratio of one of the ON-periods of the input PWM signal to one cycle of the input PWM signal becomes a predetermined value.

4. The light-emitting element driving circuit of claim 1, wherein the control circuit is configured to selectably change a cycle to alternate the divided signal and the one of the input PWM signal and the inverted PWM signal, on generating the composite control signal.

5. A display device comprising: a plurality of light-emitting elements and the light-emitting element driving circuit of claim 1.

6. A light-emitting element driving circuit for controlling luminance of light-emitting elements by using a PWM signal, the light-emitting element driving circuit comprising:

a control circuit configured to generate a control signal including a larger number of frequency components in comparison with frequency components of an input PWM signal; and a light-emitting element drive unit configured to drive the plurality of light emitting elements by using the control signal, wherein the control circuit is configured to generate a divided ON-period signal by dividing ON-periods of the input PWM signal and a divided OFF-period signal by dividing OFF-periods of the input PWM signal, generate a composite control signal by combining the divided ON-period signal and the divided OFF-period signal, and output one of the composite control signal and an inverted signal generated by inverting the composite control signal, as the control signal.

7. The light-emitting element driving circuit of claim 6, wherein the control circuit is configured to set a number of divisions of one of the ON-periods of the input PWM signal and a number of divisions of one of the OFF-periods of the input PWM signal, individually per each cycle of the input PWM signal.

8. The light-emitting element driving circuit of claim 6, wherein the control circuit is configured to set a factor to multiply a pulse width of the divided ON-period signal and a factor to multiply a pulse width of the divided OFF-period signal, individually per each cycle of the input PWM signal.

9. A display device comprising: a plurality of light-emitting elements and the light-emitting element driving circuit of claim 6.

* * * * *